April 3, 1945.  E. E. STELZER  2,373,064
BEARING EXTRACTOR
Filed Nov. 1, 1943

INVENTOR.
Earl E. Stelzer
BY J. L. Walker
ATTORNEY.

Patented Apr. 3, 1945

2,373,064

UNITED STATES PATENT OFFICE 2,373,064

BEARING EXTRACTOR

Earl E. Stelzer, Springfield, Ohio, assignor to The Parker Pattern & Foundry Company, Springfield, Ohio, a corporation of Ohio Application November 1, 1943, Serial No. 508,507

1 Claim. (Cl. 29—265)

This invention pertains to bearing and bushing extractors for removing such members having tight press fit within a recess or socket of a support.

Such members when tightly seated strongly resist pulling effort and are difficult to grasp with sufficient tenacity to overcome their resistance. Moreover it is highly desirable that such unit be withdrawn in straight axial alignment and prevented from becoming "cocked" or askew in the opening or socket from which it is being extracted.

The object of the invention is to improve the construction as well as the means and mode of operation of extractor devices whereby they may be not only of simple construction and economical to manufacture, but will be efficient in use, powerful to overcome resistance of a seated bearing, uniform in action, accurate in its application of pulling strain in a direction perpendicular to the plane of the bearing, having but few operating parts and be unlikely to get out of repair.

A further object of the invention is to provide screw pressure means for overcoming the resistance of a seated bearing or bushing by applying a greater counter pressure to the bearing mount, sufficient to overcome the resistance of the bearing.

A further object is to provide a guide by which the pressure applying device is maintained perpendicular to the plane of the bearing.

A further object of the invention is to provide an improved chuck by which a seated bearing or bushing may be grasped for pulling effort without mutilating or marring the member.

A further object of the invention is to provide a device of the character described having the advantageous structural features and meritorious characteristics and the mode of operation herein disclosed.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

Referring to the drawing wherein is shown the preferred, but obviously not necessarily the only form of embodiment of the invention, Fig. 1 is a perspective view of an assembled bearing extractor embodying the present invention.

Like parts are indicated by similar characters of reference throughout the several views.

Figure 1:
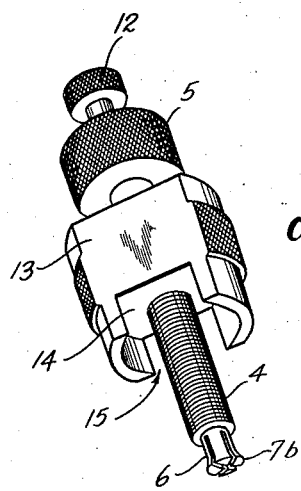
Figure 2:
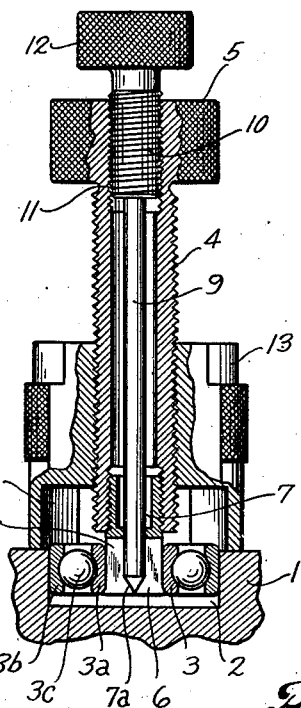
Fig. 2 is a side elevation, partly in section on line 2—2 of Fig. 3, illustrating the present extractor device applied to a bearing being extracted.
Figure 3:
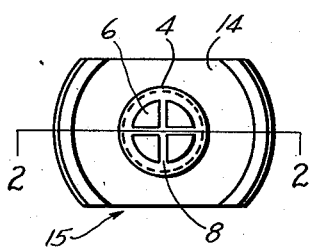
Fig. 3 is an end elevation of the device.

In the drawing 1 indicates a mount or support, which may be a part of a machine frame or other structure having therein a recess or socket 2 in which is seated a bearing unit 3. The bearing is illustrated as of the antifriction ball type comprising inner and outer ball races 3a and 3b, and intermediate bearing balls 3c. Ordinarily the bearing unit 3 is securely seated within the recess or socket 2 with a tight pressed fit in a position flush with or slightly beneath the outer face of the mount. In this position the bearing is difficult to grasp with ordinary means and with engagement sufficient to overcome its resistance.

The present bearing puller includes a hollow screw stem 4, having a knurled or roughened head 5. To one end of the screw stem connected a small expansible mandrel 6 of a size to enter easily into the central shaft opening of the bearing 3 and be tightly expanded therein. The mandrel 5 is preferably, but not necessarily detachable for interchange with other mandrels of different length or diameter. In the present instance the mandrel 6 is screw threaded into the end of the screw stem 4 and is axially bored at 7 and longitudinally split at 8 on transverse diametrical planes adjacent its outer end, the mandrel bore 7 is tapered at 7a. The extremity of the mandrel is formed with a slight flare 7b, which when the mandrel is expanded engages in slightly overlapping relation, the inner side of the bearing 3 or which by expansion is forced into interlocking engagement within the shaft opening of the bearing.

Extending through the bore of the screw stem 4 and into that of the mandrel 6 is a thrust stem or plunger 9, tapered at its extremity for camming engagement in the tapered end 7a of the mandrel bore. The plunger 9 has a screw threaded neck 10 engaging within an internally threaded portion 11 of the screw stem. The plunger is further provided with a knurled head 12 by which it may be rotated to effect longitudinal thrust engagement within the interiorly tapered portion 7a of the mandrel.

The screw stem 4 is threaded into an enlarged recessed head 13, the recessed face of which is in a plane perpendicular to the axis of the screw stem 4 and is engageable with the surface of the mount or support outside the bearing 1 from which the bearing 3 is to be removed. The recess 14 in the thrust head 13 is slightly larger than the maximum diameter of bearing for which it is adapted. The recess 14 affords clearance into which the bearing unit 3 is gradually drawn from the socket 2, and is therefore sufficiently deep to receive and contain a bearing of the largest side for which the tool is adapted. In practice the bearing pulling device is made in various sizes, applicable to bearings from small size to those of much greater proportions. Each size of extractor or bearing puller is applicable to a range of progressively different sizes of bearings.

The thrust head is cut away at one or both sides, as at 15 to expose to view the bearing being extracted, so that the progress of the operation may be observed.

In use the thrust head is applied to the bearing support or mount 1 concentric with the bearing and with the terminal mandrel 6 of the screw stem 4 extending within the central opening of the bearing. The plunger is then axially adjusted by rotating its knurled head 12 to exert expanding pressure of the tapered extremity of the plunger against the tapered end of the mandrel bore. This effects radial expansion of the mandrel into tight interlocking engagement with the bearing. The screw stem is then rotated by means of its knurled head 5 to withdraw the screw stem, and with it the bearing. By the screw action of the stem the thrust head 13 is urged against the bearing mount with increasing pressure until the thrust of the head 13 overcomes the resistance of the bearing, which is gradually drawn from the recess or socket 2 into the recess 14 of the thrust head. The bearing 3 as it is drawn from its support 1 is visible through the cut away sides 15 of the thrust head 13 and the progress of the extraction may be watched.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claim.

Having thus described my invention, I claim:

A bearing extractor including a bearing support engaging member having a threaded bore therethrough, a tube threadedly engageable with said bore and having a pair of spaced internally threaded areas therein, an expansible bearing engaging member threadedly engaged with one of said internally threaded areas of said tube for adjustment into and out of said tube, and means threadedly engaged with the other of said threaded areas of the tube and having a part movable into engagement with said bearing engaging member for expanding the latter, whereby upon operation of the tube in a direction away from the bearing support engaging member, the bearing will be withdrawn from the bearing support.

EARL E. STELZER.